United States Patent [19]
Järvinen et al.

[11] 3,887,957
[45] June 10, 1975

[54] HEADLIGHT WIPER

[76] Inventors: Uro Tapio Järvinen, Satunavagen 18; Olli Olavi Salminen, Valstavage 58, both of Marsta, Sweden, 19500

[22] Filed: Apr. 24, 1974

[21] Appl. No.: 463,831

[30] Foreign Application Priority Data
Apr. 27, 1973 Sweden .......................... 73060022

[52] U.S. Cl. .......... 15/250.16; 15/250.22; 15/250 A
[51] Int. Cl. ............................ B60s 1/20; B60s 1/44
[58] Field of Search ....... 15/250.02, 250.16, 250.22, 15/250.24, 250.25, 250 A

[56] References Cited
UNITED STATES PATENTS

| | | | |
|---|---|---|---|
| 2,334,508 | 11/1943 | Purden | 15/250 A |
| 3,058,142 | 10/1962 | Pollock | 15/250 A |
| 3,800,355 | 4/1974 | Lamprecht et al. | 15/250 A |
| 3,832,750 | 9/1974 | Jarvinen et al. | 15/250.22 |

FOREIGN PATENTS OR APPLICATIONS

| | | | |
|---|---|---|---|
| 1,204,276 | 9/1970 | United Kingdom | 15/250 A |

*Primary Examiner*—Peter Feldman
*Attorney, Agent, or Firm*—Fleit & Jacobson

[57] ABSTRACT

A headlight wiper is disclosed comprising a support ring to be mounted in a stationary position on a headlight, and a carrier ring rotatably mounted on the support ring and arranged to be driven from a driving motor. A wiper arm is pivotally mounted in the carrier ring and arranged, when the wiper is started, to be swung from an approximately tangential rest position to an approximately radial working position, in which the wiper arm will move along the lens of the headlight through the rotary movement of the carrier ring. A resetting member is carried by the support ring and arranged to cause the wiper arm to return to its rest position without any preceding reversal of the direction of movement of the carrier ring. Said resetting member is movable between an inoperative position, in which it leaves the wiper arm unaffected thereby, and an operative position, in which it acts to return the wiper arm to its rest position.

8 Claims, 11 Drawing Figures

3,887,957

SHEET 1

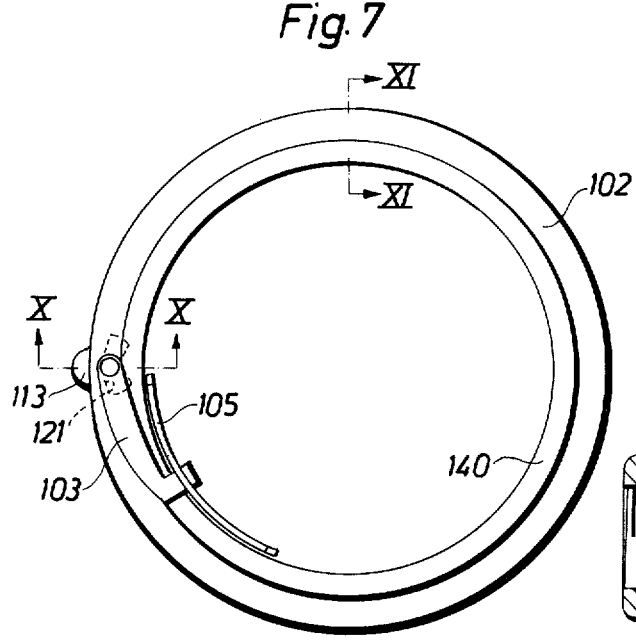
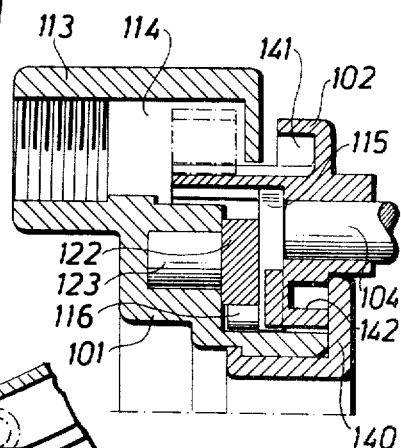
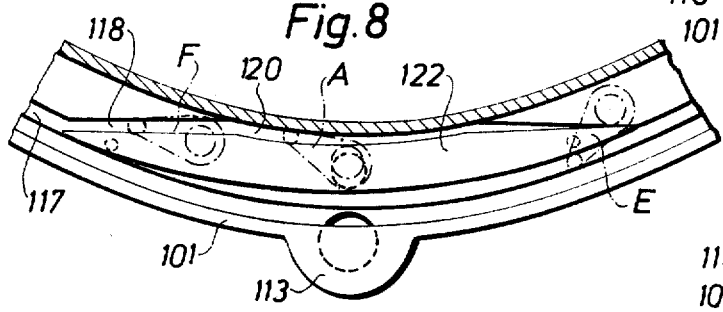
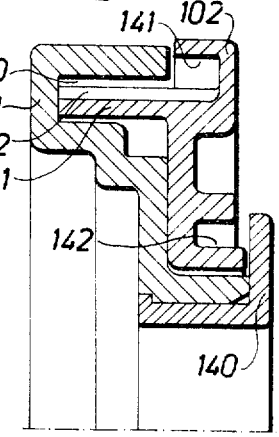
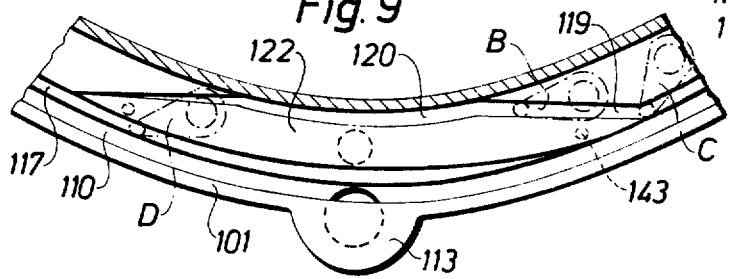

HEADLIGHT WIPER

The present invention relates to a headlight wiper. More particularly, the invention relates to a headlight wiper of the kind comprising a support ring to be mounted in a stationary position on a headlight, a carrier ring rotatably mounted on the support ring and arranged to be driven from a driving motor, and a wiper arm which is pivotally mounted in the carrier ring and arranged, when the wiper is started, to be swung from an approximately tangential rest or parking position to an approximately radial working positon, in which the wiper arm will move along the lens of the headlight through the rotary movement of the carrier ring, the wiper further comprising a resetting member carried by the support ring and arranged to cause the wiper arm to return to its rest position without any preceding reversal of the direction of movement of the carrier ring.

A headlight wiper of said kind is disclosed in U.S. Pat. No. 3,058,142. In said known wiper the resetting member is formed by a stationary cam plate, whereby the wiper arm is caused to return to its rest position once during each revolution of the carrier ring. However, as the complete operating cycle of the wiper comprises at least two and often several revolutions the automatic return of the wiper arm to its rest position during each revolution is unfavourable and involves, among other things, that the wiper arm bearing will become subjected to an unnecessary hard wear.

An ojbect of the present invention is to provide an improved headlight wiper of the kind initially specified, wherein the wiper arm may remain in its working position until the end of the complete operating cycle of the wiper.

In accordance with the invention there is provided a headlight wiper of said kind characterized in that the resetting member is movable between an inoperative position, in which it leaves the wiper arm unaffected, and an operative position, in which it causes the wiper arm to return to its rest position.

In accordance with the invention the resetting member may preferably be pivotally mounted in the support ring, although it is possible to mount it movable in any other suitable manner.

The movement of the resetting member between its said positions may be controlled by any appropriate means and in any suitable manner. For instance, said member may be caused to shift from its inoperative position to its operative position upon a predetermined number or revolutions of the carrier ring or after the elapse of a predetermined time, or said shifting of the resetting member may be controlled from a manually operated switch. Preferably, the resetting member may, however, be controlled by the movement of the carrier ring. In this case, the resetting member may be arranged to move into its inoperative position as a consequence of the movement imparted to the carrier ring when the wiper is started. It may then shift to its operative position upon a predetermined rotary movement of the carrier ring.

The wiper may suitably be provided with means for releasably maintaining the resetting member in either of its respective positions.

In accordance with a preferred embodiment of the invention, the wiper arm may be connected to a driver having a portion projecting into a guide groove in the support ring, said guide groove comprising a continuous circular portion, and a portion extending generally along a spiral line and terminating into the circular groove portion at its one end, said projecting portion of the driver being arranged to move into the circular groove portion via said spiral groove portion when the wiper is started. In this case the guide groove may suitably include a further groove portion extending generally along a spiral line and terminating in the circular groove portion at its one end, the two spiral groove portions extending in opposite directions and having their other ends connected to each other, the resetting member including a portion which, when said member is brought into its operative position, is caused to project into the circular groove portion at the junction between said groove portion and said further spiral groove portion in order to deflect the projecting portion of the driver from the circular groove portion to said further spiral groove portion. Said portion of the driver projecting into the guide groove may preferably be arragned to act on the resetting member to control the movement of said member between its respective positions.

Below the invention will be described in greater detail, reference being had to the accompanying drawings, in which:

FIG. 7 is a front elevation of a headlight wiper according to another embodiment of the invention, the wiper arm being shown in its rest position;

FIG. 8 is an enlarged fragmentary view illustrating a selected portion of the support ring of the wiper of FIG. 7 and a resetting member for the wiper arm, the resetting member being shown in its operative position, in which it is arranged to return the wiper arm from its working position to its rest position;

FIG. 9 is an enlarged fragmentary view, similar to FIG. 8, showing the resetting member in its inoperative position;

FIG. 10 is an enlarged sectional view taken along line X — X in FIG. 7; and

FIG. 11 is an enlarged sectional view taken along line XI — XI in FIG. 7.

Figure 1:
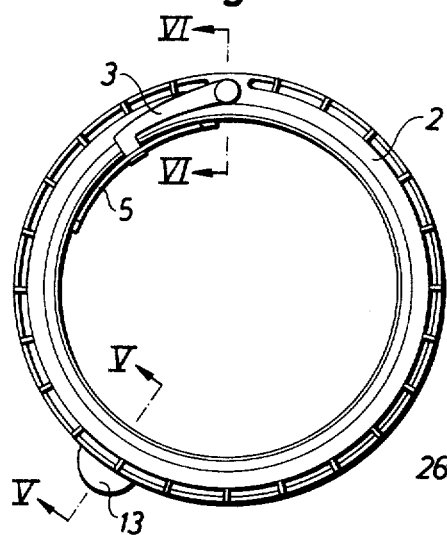
FIG. 1 is a front elevation of a headlight wiper according to a first embodiment of the invention, the wiper arm being shown in its rest or parking position.
Figure 2:
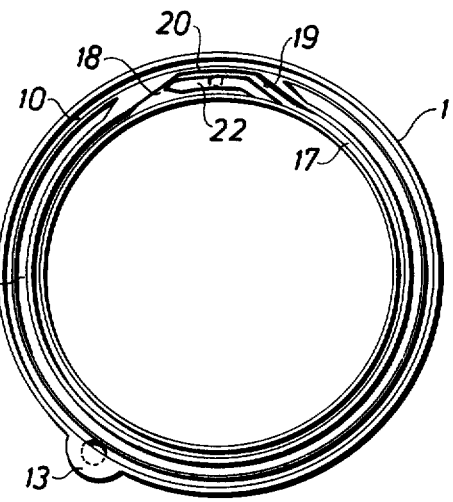
FIG. 2 is a front elevation of a support ring of the wiper of FIG. 1, said ring being adapted to be mounted in a stationary position on a headlight.
Figure 3:
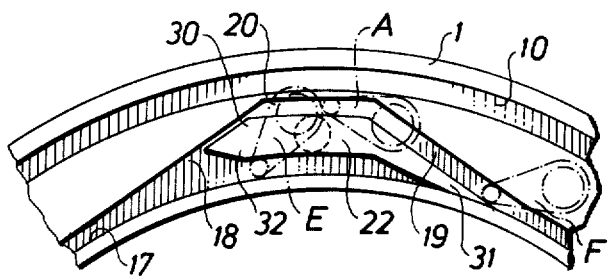
FIG. 3 is an enlarged fragmentary view illustrating a selected portion of said support ring and a resetting member for the wiper arm, said member being shown in its operative position, in which it is arranged to cause the wiper arm to return from its working position to its parking position.

Turning now to the embodiment illustrated in FIGS. 1 to 6, reference numeral 1 designates a support ring to be mounted in a stationary position on a headlight (not shown). On the support ring 1 a carrier ring 2 is rotatably mounted to serve as a carrier for a wiper arm 3, at its one end pivotally mounted in the carrier ring 2 by means of a shaft 4 and provided with a wiper blade 5 at its free end. On its radially inner surface the carrier ring 2 is provided with a circumferentially extending flange 6, adapted to engage in a circumferential slot 7 in the support ring 1 to maintain the carrier ring 2 against axial displacement relative to the support ring 1. Reference numerals 8 and 9 designate grooves provided in the carrier ring 2 and the support ring 1, respectively, to receive suitable sealing rings (not shown). The carrier ring 2 may be mounted on the support ring 1 through a heating and shrinking operation.

On its rear end the carrier ring 2 is provided with an annular flange 11 projecting into a circular groove 10 in the support ring 1. The radially and axially outer portion of flange 11 forms a toothed rim 12 intended to be engaged and driven by a pinion (not shown) which may be inserted into a circulat cavity 14 provided in a radially projecting portion 13 of support ring 1. The outer portion of said cavity 14 is threaded to receive a threaded nipple (not shown) provided on the tubular outer portion of a Bowden-cable, the inner wire of which carries the pinion used for driving tooth rim 12. At its opposite end the Bowden-cable may be connected to an electric drive motor, by means of which the carrier ring 2 may be rotated.

At its opposite end to wiper arm 3 shaft 4 is provided with a driver 15 mounted in a fixed position on said shaft and having the shape of a generally triangular plate which, on its side turned away from shaft 4, is provided with a guide pin 16 radially displaced from shaft 4. Said pin 16 projects into a guide groove in the support ring 1. As can be seen from the drawings, said guide groove comprises a radially inner portion formed by a continuous circular groove 17 and two generally spiral groove portions 18 and 19 extending in opposite directions and, at their radially outer ends, connected to each other by means of a short intermediate groove portion 20 extending along a part-circular arc. The driver 15 is received in a recess 21 in the rear surface of the carrier ring 2. Said recess permits a limited rotation of the driver 15 and the wiper arm 3 between an angular position corresponding to the position A of the driver shown in dash-dotted lines in FIG. 3 and in which the wiper arm 3 is in its parking position illustrated in FIG. 1, and a position corresponding to the driver positions C, D and E shown in FIGS. 3 and 4, respectively, where the wiper arm 3 and the wiper blade 5 carried thereby assume their working positions and extend in an approximately radial direction over the lens of the headlight.

The wiper is further provided with a double-armed lever 22 mounted for limited pivotal movement in the support ring 1 by means of a pivot pin 23. Said lever 22 forms a resetting member for the wiper arm 3 serving to return the wiper arm from its working position to its rest position at the end of each complete working cycle.

Additionally, the carrier ring and the support ring are provided with recesses in the shape of circumferentially extending grooves 24, 25 and 26, respectively, in which radially extending stiffening webs 27, 28 and 29, respectively, are provided at regular intervals.

Figure 4:
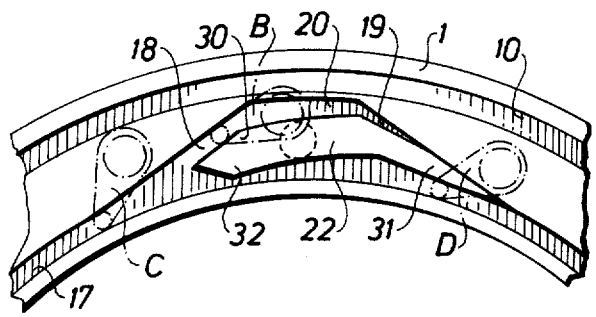
FIG. 4 is an enlarged fragmentary view, similar to FIG. 3, showing the resetting member in its inoperative position.
Figure 5:
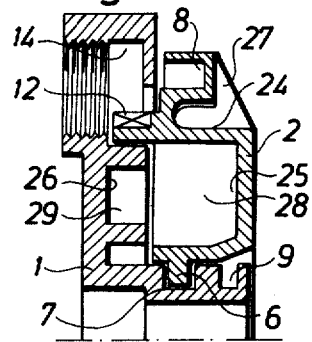
FIG. 5 is an enlarged sectional view taken along line V — V in FIG. 1.
Figure 6:
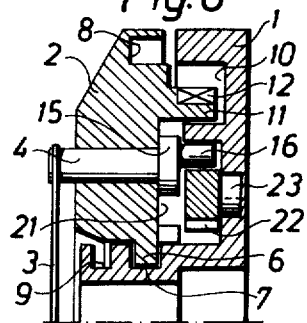
FIG. 6 is an enlarged sectional view taken along line VI — VI in FIG. 1.

The manner of operation of the wiper above described will now be explained. In parking position the wiper arm 3 and the wiper blade 5 are located adjacent to the circumferential edge of the headlight lens, as shown in FIG. 1. The pin 16 of the driver 15 is now located in the short part-circular portion 20 of the guide groove. When the drive motor connected to the wiper is energized the carrier ring 2 is caused to rotated in a counter-clockwise direction according to FIG. 1. As this happens, the guide pin 16 moves from groove portion 20 into the inner circular groove portion 17 through the spiral groove portion 18. Simultaneously, the wiper arm 3 is swung comparatively rapidly from its tangential rest position to its approximately radial working position. During the continued rotation of the carrier ring 2 in counter-clockwise direction the wiper blade 5, now in its radial working position, will successively wipe the entire surface of the headlight lens. During its abovementioned passage through groove portion 18 pin 16 strikes the edge portion 30 of lever 22 and thereby forces the lever to shift from its operative position, shown in FIG. 3, to its inoperative position illustrated in FIG. 4. In FIG. 4, B designates the instantaneous position of the driver 15 immediately upon said movement of the resetting member formed by lever 22. C designates the position of the driver 15 when it leaves the spiral groove portion 18 and enters the circular groove portion 17. When the carrier ring 2 has been rotated slightly less than one complete revolution driver 15 will reach position D, as shown in FIG. 4, and pass portion 31 of lever 22 without acting on lever 22 or being influenced thereby. However, after a short additional rotation of the carrier ring 2, the driver pin 16 will strike portion 32 of lever 22 and cause the lever automatically to return to its operative position shown in FIG. 3. The corresponding position of the driver has been designated E in FIG. 3. The carrier ring will then continue almost another complete revolution with the wiper arm 3 still remaining in its working position. However, as lever 22 is now in its operative position shown in FIG. 3, when the wiper arm again approaches the resetting member formed by lever 22, pin 16 will be transferred from the circular inner groove portion 17 to the spiral groove portion 19 and again reach its starting position A after having passed the intermediate position F, shown in FIG. 3.

In order to ensure that the lever 22 will not move from one of its said positions to another unintentionally, e.g., under the influence of vibrations transmitted to the wiper from a vehicle on which the wiper has been mounted, the wiper may be provided with suitable means for releasably maintaining the lever in its respective end positions.

In FIGS. 7 to 11, showing a headlight wiper according to an alternative embodiment of the invention, elements corresponding to those of the embodiment according to FIGS. 1 to 6 have been identified by reference numerals formed as the sum of the reference numerals used in FIGS. 1 to 6 and the number 100. Thus, reference numeral 101 designates a stationary support ring on which a carrier ring 102 is rotatably mounted to carry a wiper arm 103, pivotally mounted in the carrier ring by means of a shaft 104 and having a wiper blade 105 provided at its free end.

On its rear side the carrier ring 102 is provided with an annular flange 111, projecting into a circular groove 110 in the support ring 101. Said flange 111 forms a toothed rim 112 intended to be driven by a pinion shown in dash-dotted lines in FIG. 10. Said pinion is inserted into a circular cavity 114 in a radially projecting portion 113 of the support ring 101 and may preferably be mounted on the inner wire of a Bowden-cable (not shown) having its opposite end connected to an electric drive motor.

On the wiper arm shaft 104, a driver 115 is mounted in a fixed position. Said driver is provided with a pin 116 projecting into a guide groove in the support ring 101. Said guide groove includes a radially outer portion formed by a continuous circular groove 117, and two spiral groove portions 118 and 119, the radially inner ends of which are connected to each other by a short part-circular groove portion 120. The driver 115 is received in a recess 121 in the rear surface of the carrier ring 102, arranged to permit a liminted rotation of the driver between positions corresponding to the parking position and the working position of the wiper arm 3.

A resetting member is formed by a double-armed lever 122 mounted for limited pivotal movement in the support ring 101 by means of a pivot pin 123.

Reference numeral 140 designates a locking ring serving to prevent axial displacement of the carrier ring 102 on the support ring 101. Reference numerals 141 and 142 designate circular grooves provided in the carrier ring 102 to receive suitable sealing rings (not shown).

On its rear side and near each end thereof the lever 122 is provided with small bosses 143 shown in dashed lines in FIGS. 8 and 9 and serving to cooperate with recesses (not shown) in the adjacent surface of support ring 101 for releasably maintaining the lever 122 in its respective end positions.

The manner of operation of the wiper according to FIGS. 7 to 11 is substantially the same as for the wiper according to FIGS. 1 to 6. Thus, with the wiper arm and wiper blade design illustrated in FIGS. 7 to 11, when the wiper is started, the carrier ring 102 will rotate in a counter-clockwise direction according to FIG. 7, causing the driver 115 to move from position A in dash-dotted lines in FIG. 8 to position B shown in dash-dotted lines in FIG. 9 and then to pass the positions C, D, E and F, in the order now mentioned, before reaching parking position A again after two complete revolutions of carrier ring 102. The various positions A to F of the driver 115 correspond to positions A to F of driver 15, shown in FIGS. 3 and 4.

As shown in dashed lines in FIG. 7, the recess 121 provided in carrier ring 102 for receiving the driver 115 may have a butterfly shape to permit the wiper 103 with its wiper blade 105 and the driver 115 to be replaced by a wiper arm extending in a clockwise direction from shaft 104 instead of in a counter-clockwise direction as illustrated in FIG. 7. If the wiper arm 103 is replaced by such a modified wiper arm, the carrier ring 102 will have to rotate in a clockwise direction instead of in a counter-clockwise direction as above described.

The various members of the wiper above described may consist of any suitable material. For instance, the support ring and the carrier ring may be moulded from a suitable plastic material, while the wiper arm, its shaft and the carrier may consist of stainless steel.

Naturally, the invention is not restricted to the embodiment above described. Thus, the invention may be realized in many other ways than those illustrated in the drawings. For instance, the resetting member may be actuated by other means than the driver used in the above embodiments to rotate the wiper arm between its extreme positions.

What we claim is:

1. A headlight wiper comprising a support ring to be mounted in a stationary position on a headlight, a carrier ring rotatably mounted on the support ring and arranged to be driven from a driving motor, and a wiper arm which is pivotally mounted in the carrier ring and arranged, when the wiper is started, to be swung from an approximately tangential rest position to an approximately radial working position in which the wiper arm will move along the lens of the headlight through the rotary movement of the carrier ring, the wiper further comprising a resetting member carried by the support ring and arranged to cause the wiper arm to return to its rest position without any preceding reversal of the direction of movement of the carrier ring, characterized in that the resetting member is movable between an inoperative position, in which it leaves the wiper arm unaffected thereby, and an operative position, in which it brings the wiper arm to return to its rest position.

2. A headlight wiper according to claim 1, characterized in that the resetting member is pivotally mounted in the support ring.

3. A headlight wiper according to claim 1, characterized in that the movement of the resetting member between said positions is controlled by the movement of the carrier ring.

4. A headlight wiper according to claim 3, characterized in that the resetting member is arranged to be moved into its inoperative position as a consequence of the movement imparted to the carrier ring when the wiper is started.

5. A headlight wiper according to claim 3, characterized in that the resetting member is arranged to shift to its operative position upon a predetermined rotary movement of the carrier ring.

6. A headlight wiper according to claim 1, characterized by means for releasably maintaining the resetting member in either of its respective positions.

7. A headlight wiper according to claim 1, wherein the wiper arm is connected to a driver having a portion projecting into a guide groove in the support ring, said guide groove comprising a continuous circular portion, and a portion extending generally along a spiral line and terminating in the circular groove portion at its one end, said projecting portion of the driver being arranged to move into the circular groove portion via said spiral groove portion when the wiper is started, characterized in that the guide groove comprises a further groove portion extending generally along a spiral line and terminating in the circular groove portion at its one end, the two spiral groove portions extending in opposite directions and having their other ends connected to each other, the resetting member including a portion which, when said member is brought into its operative position, is caused to extend into the circular groove portion at the junction between said groove portion and said further spiral groove portion in order to deflect the projecting portion of the driver from the circular groove portion to said further spiral groove portion.

8. A headlight wiper according to claim 7, characterized in that the projecting portion of the driver is arranged to act on the resetting member to control the movement of said member between its respective positions.

* * * * *